United States Patent
Shah

(10) Patent No.: US 9,226,131 B2
(45) Date of Patent: *Dec. 29, 2015

(54) COMMUNICATION PROTOCOL PREFERENCES

(71) Applicant: T-Mobile USA, Inc., Bellevue, WA (US)

(72) Inventor: Mehul Jayant Shah, Sammamish, WA (US)

(73) Assignee: T-Mobile USA, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,317

(22) Filed: Sep. 16, 2013

(65) Prior Publication Data

US 2014/0233455 A1 Aug. 21, 2014

Related U.S. Application Data

(63) Continuation of application No. 12/770,632, filed on Apr. 29, 2010, now Pat. No. 8,538,405.

(51) Int. Cl.
*H04W 8/02* (2009.01)
*H04W 8/22* (2009.01)
(Continued)

(52) U.S. Cl.
CPC .............. *H04W 8/08* (2013.01); *H04L 69/16* (2013.01); *H04L 69/167* (2013.01); *H04L 69/24* (2013.01);
(Continued)

(58) Field of Classification Search
CPC ....... H04L 69/167; H04L 69/16; H04L 67/04; H04L 67/327; H04L 69/18; H04W 88/06; H04W 8/26; H04W 36/0011; H04W 48/18; H04W 80/00; H04W 80/04

USPC ................. 370/328, 252, 278, 466, 331, 347; 709/220, 238; 455/419

See application file for complete search history.

(56) References Cited

U.S. PATENT DOCUMENTS 6,067,452 A 5/2000 Alexander
6,788,676 B2 9/2004 Partanen et al.
(Continued)

FOREIGN PATENT DOCUMENTS

| KR | 10-2006-0022937 A | 3/2006 |
| WO | WO 03/084185 A1 | 10/2003 |
| WO | WO 2009/022750 A2 | 2/2009 |

OTHER PUBLICATIONS

3rd Generation Partnership Project (3GPP); Technical Specification Group Services and System Aspects; Feasibility Study for Transport and Control Separation in the PS CN Domain (Release 4).

(Continued)

*Primary Examiner* — Nizar Sivji
(74) *Attorney, Agent, or Firm* — Knobbe Martens Olson & Bear, LLP

(57) ABSTRACT

Systems and methods for the management of communications related to telecommunications-based devices are provided. Telecommunications-based devices initiate requests to gateway computing devices corresponding to a radio communication network to establish data communications. The gateway computing device accepts the communication request and specifies an ordered preference of one or more communication protocols that will be used telecommunications-based devices accessing the wireless communication network. The telecommunications-based device processes the acceptance and selects a communication protocol from the ordered preference provided by the gateway computing device.

20 Claims, 9 Drawing Sheets

(51) Int. Cl.
  *H04W 8/08* (2009.01)
  *H04L 29/06* (2006.01)
  *H04L 29/12* (2006.01)
  *H04W 80/04* (2009.01)

(52) U.S. Cl.
  CPC ........... *H04W 8/22* (2013.01); *H04L 29/12216* (2013.01); *H04L 61/2007* (2013.01); *H04L 69/18* (2013.01); *H04W 80/045* (2013.01)

(56) References Cited

U.S. PATENT DOCUMENTS

| | | |
|---|---|---|
| 7,698,432 B2 | 4/2010 | Short et al. |
| 7,702,346 B2 | 4/2010 | Choksi |
| 8,000,689 B2 | 8/2011 | Featherstone et al. |
| 8,321,584 B2 | 11/2012 | Dobbins et al. |
| 8,634,788 B2 | 1/2014 | Wright et al. |
| 2004/0187021 A1 | 9/2004 | Rasanen |
| 2006/0018291 A1 | 1/2006 | Patel et al. |
| 2006/0028998 A1* | 2/2006 | Lioy et al. ............... 370/252 |
| 2006/0085543 A1 | 4/2006 | Hrastar et al. |
| 2006/0104262 A1 | 5/2006 | Kant et al. |
| 2006/0117020 A1 | 6/2006 | Toebes et al. |
| 2007/0030973 A1 | 2/2007 | Mikan |
| 2007/0097997 A1 | 5/2007 | Maclean et al. |
| 2007/0115934 A1 | 5/2007 | Dauster et al. |
| 2007/0274255 A1 | 11/2007 | Hung et al. |
| 2007/0283022 A1 | 12/2007 | Rajko et al. |
| 2008/0160972 A1 | 7/2008 | Haran et al. |
| 2008/0263632 A1 | 10/2008 | Keon |
| 2009/0034512 A1 | 2/2009 | Bantukul et al. |
| 2009/0037595 A1 | 2/2009 | Breau et al. |
| 2009/0047947 A1 | 2/2009 | Giaretta et al. |
| 2009/0298478 A1 | 12/2009 | Tyhurst et al. |
| 2009/0305671 A1 | 12/2009 | Luft et al. |
| 2010/0027448 A1 | 2/2010 | Puthiyandyil et al. |
| 2010/0095317 A1 | 4/2010 | Toebes et al. |
| 2010/0234025 A1 | 9/2010 | Julka |
| 2011/0106946 A1 | 5/2011 | Bao et al. |

OTHER PUBLICATIONS

3rd Generation Partnership Project; Technical Specification Group Core Network and Terminals; IP Multimedia (IM) Session Handling; IM Call Model; Stage 2 (Release 8).

3rd Generation Partnership Project; Technical Specification Group Core Network and Terminals; Numbering, Addressing and Identification (Release 8).

3rd Generation Partnership Project; Technical Specification Group Core Network and Terminals; Signalling Flows for the IP Multimedia Call Control Based on Session Initiation Protocol (SIP and Session Description Protocol (SDP); Stage 3 (Release 5).

3rd Generation Partnership Project; Technical Specification Group Core Network and Terminals; Signalling Flows for the IP Multimedia Call Control Based on SEssion Initiation Protocol (SIP) and Session Description Protocol (SDP); Stage 3 (Release 5).

3rd Generation Partnership Project; Technical Specification Group Services and System Aspects; General Packet Radio Service (GPRS) Enhancements for Evolved Universal Terrestrial Radio Access Network (E-UTRAN) Access (Release 8).

3rd Generation Partnership Project; Technical Specification Group Services and System Aspects; Internet Protocol (IP) based IP Multimedia Subsystem (IMS) Emergency Sessions (Release 7).

3rd Generation Partnership Project; Technical Specification Group Services and System Aspects; IP Multimedia Subsystem (IMS); Stage 2 (Release 8).

3rd Generation Partnership Project; Technical Specification Group Services and System Aspects; One Tunnel Functional Description (Release 7).

GPRS Roaming Guidelines, Permanent Reference Document: IR.33, Version 3.2.0, Apr. 3, 2003.

Inter-Service Provider IP Backbone Guideline, Permanent Reference Document: 1R.34, Version 4.2, Oct. 30, 2007.

RFC2766—Network Address Translation-Protocol; Translation by G. Tsirtsis and P. Srisuresh, Feb. 2000.

T-Mobile's 3G Speed Reduction Cap, BerryReporter.com <http://www.berryreporter.com/t-mobiles-3g-speed-reduction> [retrieved Aug. 28, 2014].

\* cited by examiner

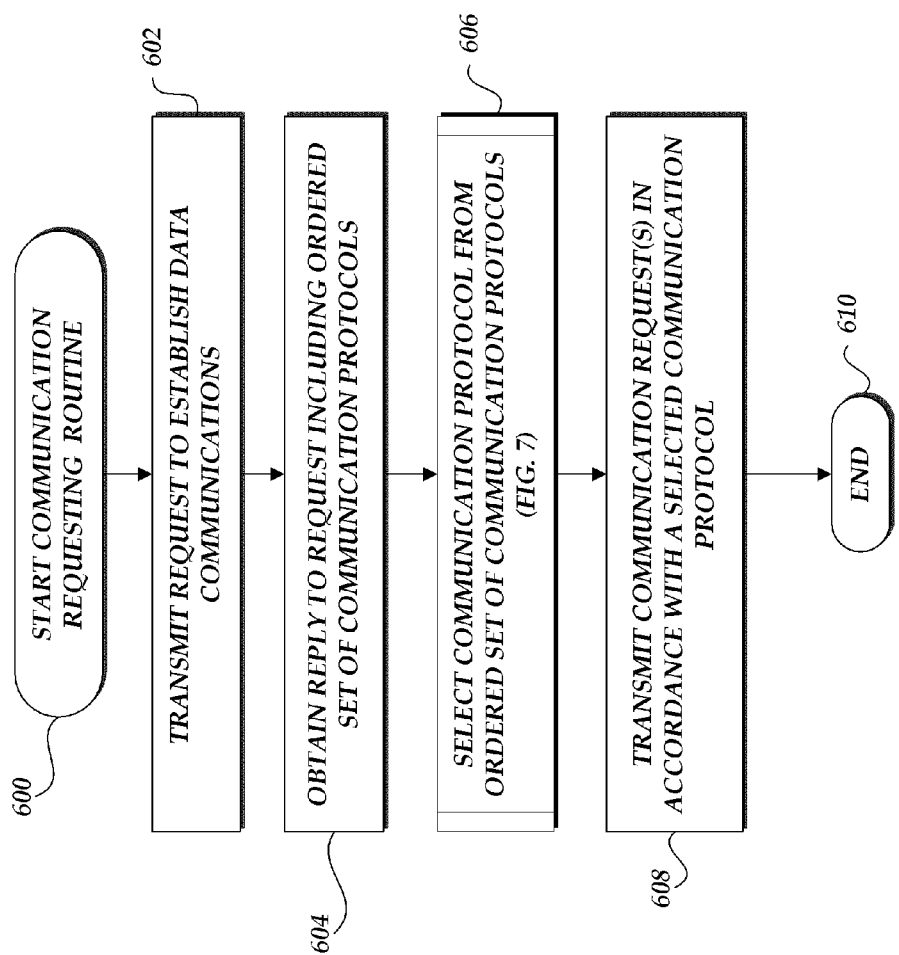

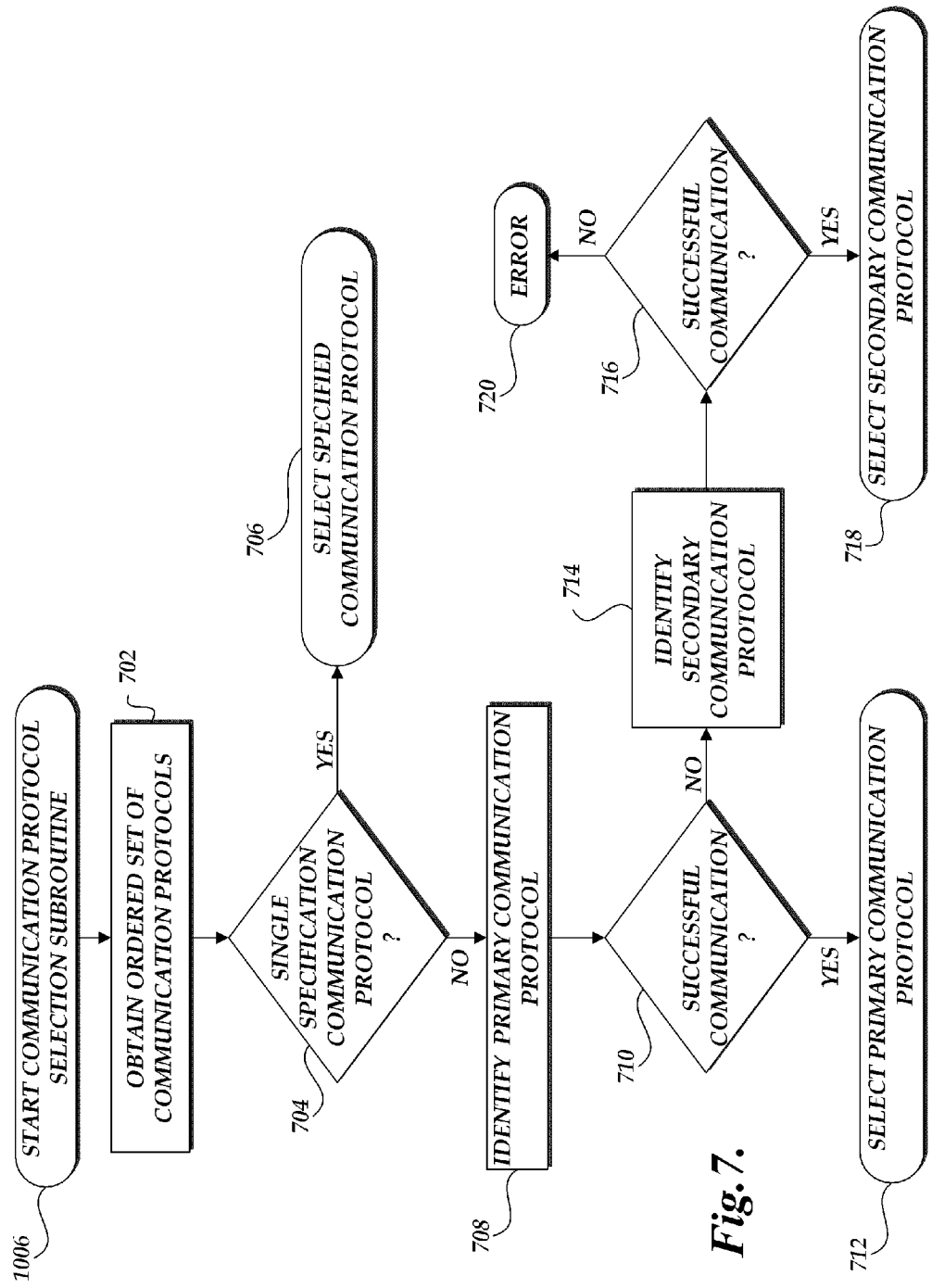

COMMUNICATION PROTOCOL PREFERENCES

CROSS-REFERENCE TO RELATED APPLICATION

This application is a continuation of U.S. patent application Ser. No. 12/770,632, entitled COMMUNICATION PROTOCOL PREFERENCES, and filed Apr. 29, 2010, the entirety of which is incorporated by reference herein.

BACKGROUND

Generally described, computing devices and communication networks facilitate the collection and exchange of information. Utilizing a communication network and relevant communication protocols, a computing device can engage in data communications with a wide variety of computing devices. For example, in accordance with an addressing protocol, a computing device can interact with specific computing devices by specifying data packets intended for specific network-based addresses. Prior to initiating connectivity to the communication network, however, the external computing devices must have some type of agreement with the computing devices associated with communication networks, often referred to as gateway computing devices, as to the communication protocols that will be utilized to facilitate communication.

In accordance with a telecommunications-based environment, telecommunications-based devices, such as mobile terminals, establish communications with gateway computing devices via a wireless communication network. The gateway computing devices provide data communication to data networks, such as the local area network or wide area networks (e.g., the Internet). Typically, a service provider maintains the wireless access communication network and gateway computing device for telecommunications-based devices that are associated with subscribers/customers of the service provider, often referred to as a home network. Additionally, multiple service providers have business relationships that allow telecommunications-based devices that are not associated with subscribers/customer of the particular service provider to use a foreign/visitor radio access network to access other data networks. The non-subscribers telecommunications-based devices are often referred to as roaming telecommunications-based devices from the perspective of the service provider and the wireless communication network are often referred to as visiting networks/foreign networks from the perspective of the non-subscriber telecommunications-based device.

Subscriber telecommunications-based devices are often configured with software applications, configurations, or other settings that specify the type of communication protocols that will be utilized to establish communications with the home network gateway computing devices. For example, a home network service provider can provision subscriber telecommunications-based device with the specification of the specific type of addressing protocol that will be utilized to transmit data via the home network. In contrast, visiting network service providers typically have not ability to configure roaming telecommunications-based devices prior to the roaming telecommunications-based devices attempting to establish communications with the visiting network. Moreover, these non-subscriber telecommunications-based devices (e.g., roaming telecommunications-based devices) may be configured in accordance with their respective home network configurations that may be incompatible or non-optimal with the corresponding configurations for the visiting network.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIG. 6 is a flow diagram illustrative of a communication requesting routing implemented by a mobile telecommunications-based device in a telecommunication environment; and FIG. 7 is a flow diagram illustrative of a communication protocol selection sub-routine implemented by a telecommunications-based device in a telecommunication environment.

DETAILED DESCRIPTION

Generally described, aspects of the present disclosure relate to the management of communications related to telecommunications-based devices. In an illustrative embodiment, gateway computing devices corresponding to a radio communication network can specify an ordered preference of one or more communication protocols that will be used telecommunications-based devices accessing the wireless communication network. Additionally, by integrating the specification of the ordered preference of the one more communication protocols into a response to initial access request, the requesting telecommunications-based device can mitigate the need for repeating access requests. Illustratively, the present disclosure will be discussed with regard to the specification of an ordered preference for various addressing protocols utilized in conjunction with data packet delivery via the wireless communication networks including the Internet Protocol version 4 ("IPv4") and the Internet Protocol version 6 ("IPv6") addressing protocols.

Although aspects of the present disclosure will be described with regard to an illustrative telecommunication environment and component interactions, communication protocols and flow diagrams, one skilled in the relevant art will appreciate that the disclosed embodiments are illustrative in nature and should not be construed as limiting. Specifically, although the present disclosure will be described with regard to the two above-referenced addressing protocols, the systems and methods in the present disclosure may utilized in conjunction with various communication protocols, including additional or different addressing protocols. Additionally, although the term telecommunication device is used in this document, the term represents any type of device having a component for communicating with one or more other devices via one or more communication paths. Such communication paths can include wireless communication paths (via infra-red, RF, optical, terrestrial, or satellite communication media) and wired communication paths. Still further, although the present disclosure references a telecommunications-based device, one skilled in the relevant art will appreciate that a telecommunications-based device may also be referred to as a wireless computing device, a mobile communication device, a mobile terminal, or a computing device. Examples of telecommunication devices are described below with regard to FIG. 1. Accordingly, reference to a telecommunication device should not be interpreted as including any particular functionality or operation not described in the present disclosure.

Figure 1:
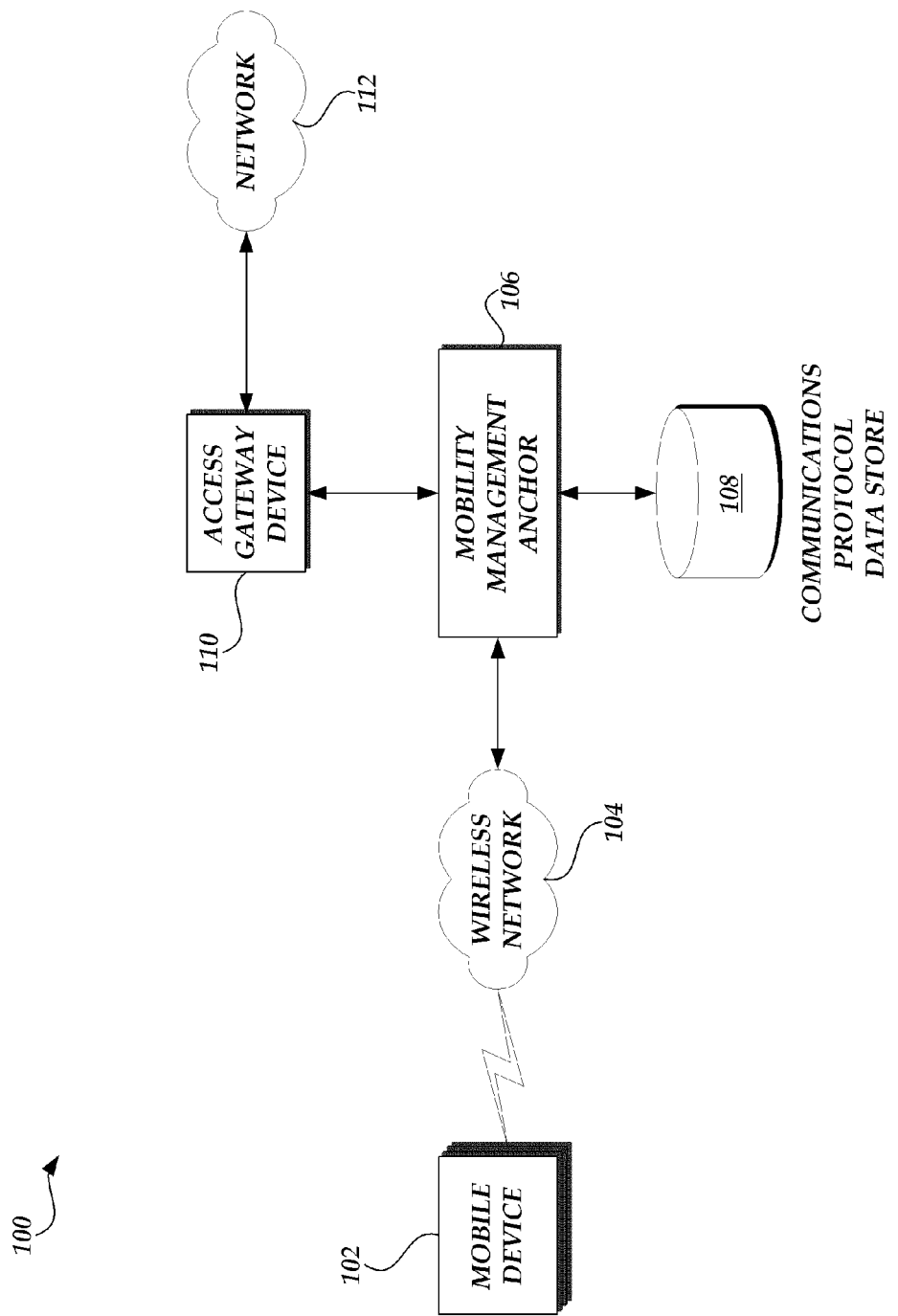
FIG. 1 is a block diagram illustrative of a telecommunication environment including a number of telecommunication devices and gateway computing devices.

With reference now to FIG. 1, a block diagram illustrative of a telecommunication environment 100 will be described. The telecommunication device communication environment 100 can include a number of telecommunications-based device 102 associated with a user. The telecommunications-based device 102 can correspond to a wide variety of devices or components that are capable of initiating, receiving or facilitating communications over a radio communication network 104 including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. In an illustrative embodiment, the telecommunications-based device 102 include a wide variety of software and hardware components for establishing communications over one or more communication networks, including wireless communication network 104 or a wired communication network (not shown). Illustrative components of a telecommunications-based device 102 will be described in greater detail with regard to FIG. 2.

With continued reference to FIG. 1, in communication with the telecommunications-based devices 102 are a number of computing devices, generally referred to as gateway computing devices. Specifically, as illustrated in FIG. 1, the gateway computing devices can include a mobility management anchor computing device 106 for obtaining requests for connectivity to communication networks from telecommunications-based devices 102 via the wireless communication network 104. Illustratively, the mobility management anchor computing device 106 may correspond to a Mobility Management Entity ("MME") key control node as specified for the Long Term Evolution ("LTE") air interface protocol. In another example, the mobility management anchor computing device 106 may correspond to the Serving GPRS Support Node ("SGSN") node in according the General Packet Radio Service ("GPRS") and Universal Mobile Telecommunications System ("UMTS") air interface protocols. One skilled in the relevant art will appreciate that the mobility management anchor computing device 106 is not limited to any specific structure or component of any one air interface protocol.

As will be discussed in greater detail below, the mobility management anchor computing device 106 can maintain data, such as in the form of data tables, that facilitate the selection of an ordered preference of communication protocols to be utilized by telecommunications-based device 102. Specifically, the mobility management anchor computing device 106 can maintain one or more communication protocol data stores 108 for maintaining the data for determining the ordered preference of communication protocols. The communication protocol data stores 108 may correspond to a single data store or a set of data stores, maintain either locally or in a distributed manner. Still further, at least some portion of the communication protocol data stores 108 may correspond to service provider home networks. Additionally, at least some portion of the communication protocol data stores 108 may correspond to service provider visited networks. The telecommunication device communication environment 100 can further include one or more access gateway computing devices 110 that facilitate, or otherwise provider, data connectivity to the communication network 112.

In an illustrative embodiment, the telecommunication device communication environment 100 can include a number of additional components, systems and/or subsystems for facilitating communications with the telecommunications-based devices 102 and/or the mobility management anchor computing device 106, or other devices. The additional components can facilitate wireless communication network 104, such as a cellular radio access network, a wireless network based on the family of IEEE 802.11 technical standards ("WiFi"), a wireless network based on IEEE 802.16 standards ("WiMax"), a converged wireless telecommunication network such as Unlicensed Mobile Access ("UMA"), or General Access Network ("GAN"), and other wireless networks. The operation of mobile communication networks, such as wireless communication network 104 are well known and will not be described in greater detail. Additionally, although the wireless communication network 104 is illustrated as a single communication network, one skilled in the relevant art will appreciate that the communication network can be made up of any number of public or private communication networks and/or network connections.

Figure 2:
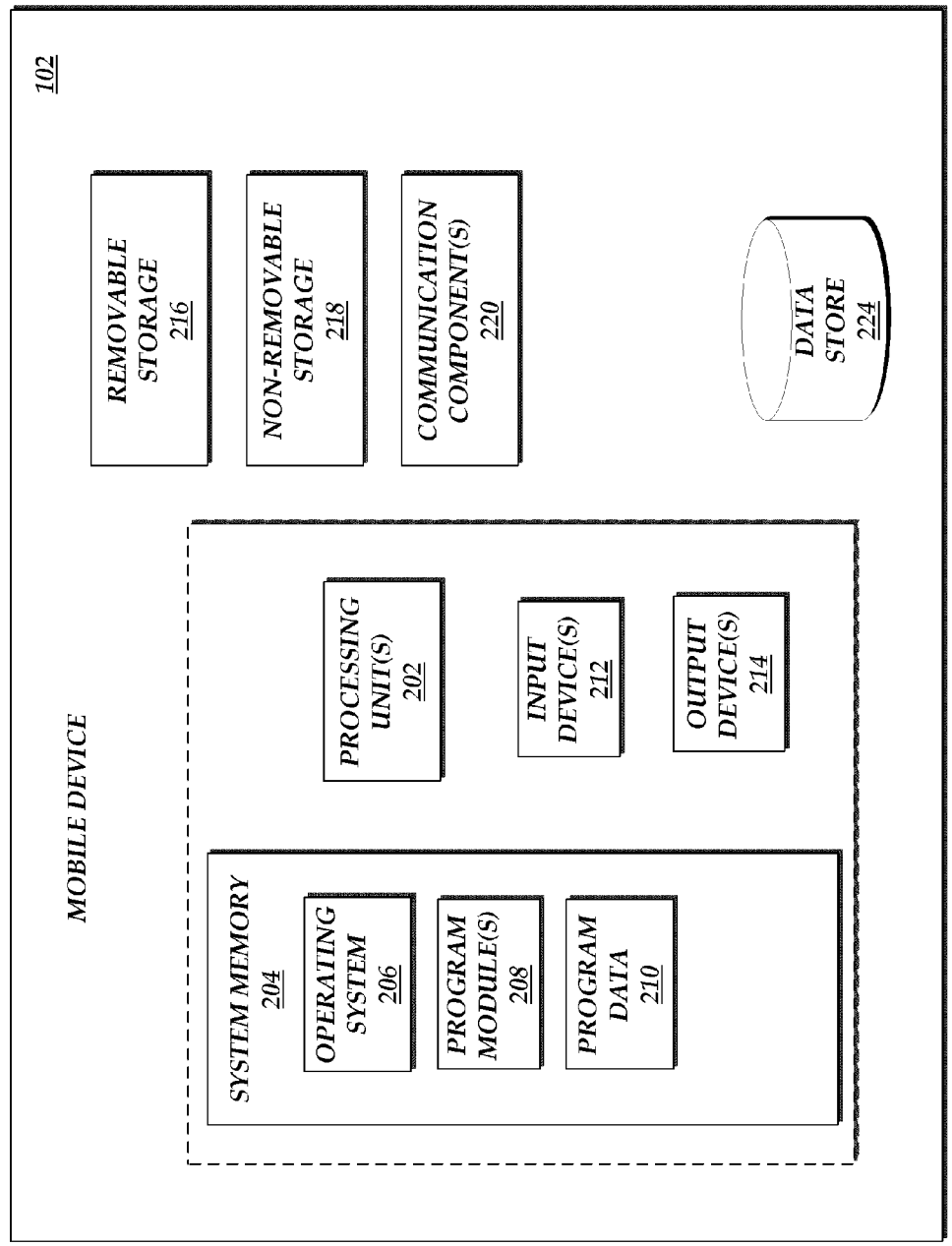
FIG. 2 is a block diagram illustrative of components of a telecommunication device for use the generation, management and display of group-based information.

With reference now to FIG. 2, illustrative components of a telecommunication device, such as telecommunications-based device 102, for use in the creation and display of group-based information displays will be described. The telecommunications-based device 102 may include one or more processing units 202, such as one or more CPUs. The telecommunications-based device 102 may also include system memory 204, which may correspond to any combination of volatile and/or non-volatile storage mechanisms. The system memory 204 may store information which provides an operating system component 206, various program components 208, program data 210, and other components. The above-enumerated list of components is representative and is not exhaustive of the types of functions performed, or components implemented, by the telecommunications-based device 102. One skilled in the relevant art will appreciate that additional or alternative components may also be included in the telecommunications-based device 102 to carry out other intended functions such as a mobile telephone functions. The telecommunications-based device 102 performs functions by using the processing unit(s) 202 to execute instructions provided by the system memory 204. The telecommunications-based device 102 may also include one or more input devices 212 (keyboard, mouse device, specialized selection keys, etc.) and one or more output devices 214 (displays, printers, audio output mechanisms, etc.).

With continued reference to FIG. 2, the telecommunications-based device 102 may also include one or more types of removable storage 216 and one or more types of non-removable storage 218. Still further, the telecommunications-based device 102 can include communication components 220 for facilitating communication via wired and wireless communication networks, such as the wireless communication network 104 and data network 118 (FIG. 1). Examples of various communication protocols include, but are not limited to, Bluetooth, the family of IEEE 802.11 technical standards ("WiFi"), the IEEE 802.16 standards ("WiMax"), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA, and similar technologies).

Figure 3A:
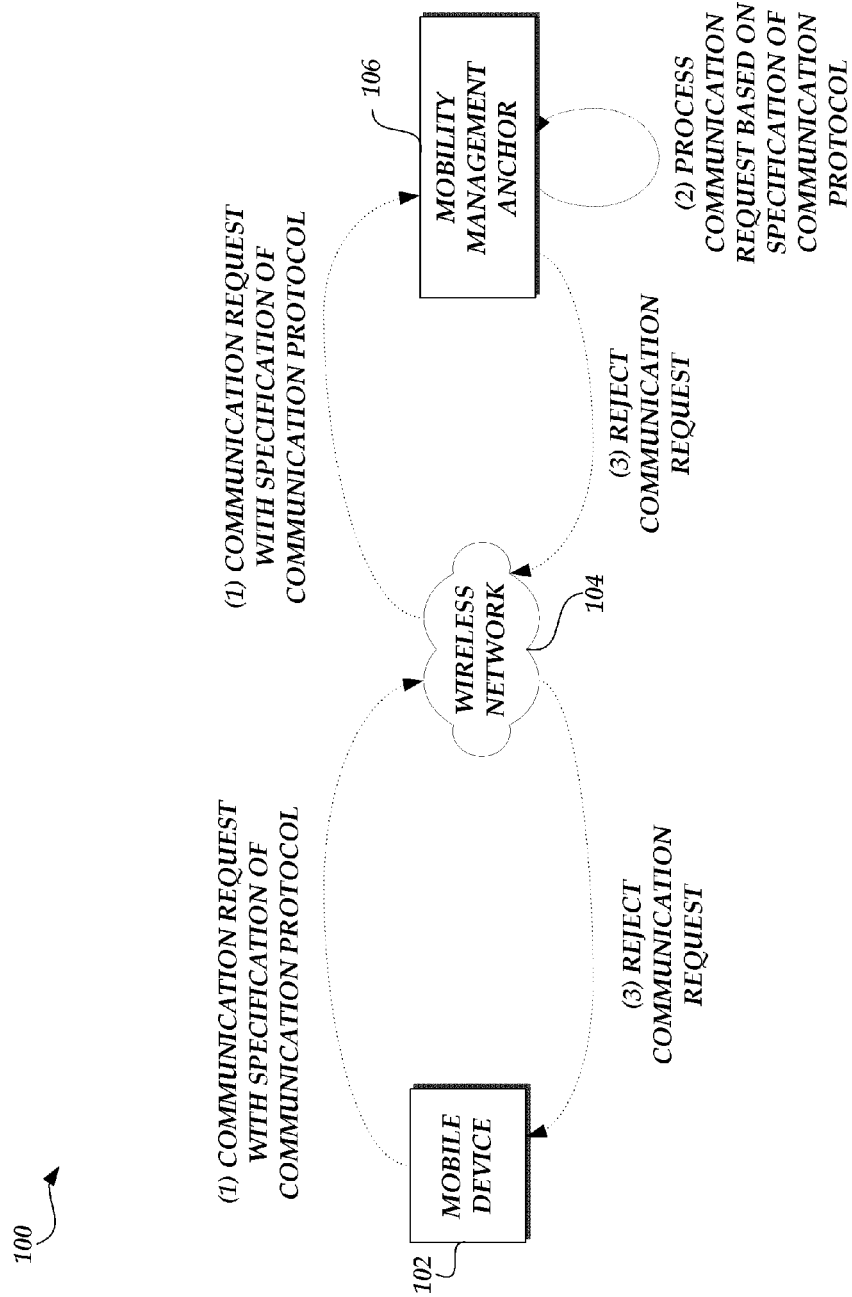
FIGS. 3A and 3B are block diagrams of the telecommunication environment of FIG. 1 illustrating an embodiment for the specification of communication protocols between a mobile telecommunications-based device and a gateway computing device.
Figure 3B:
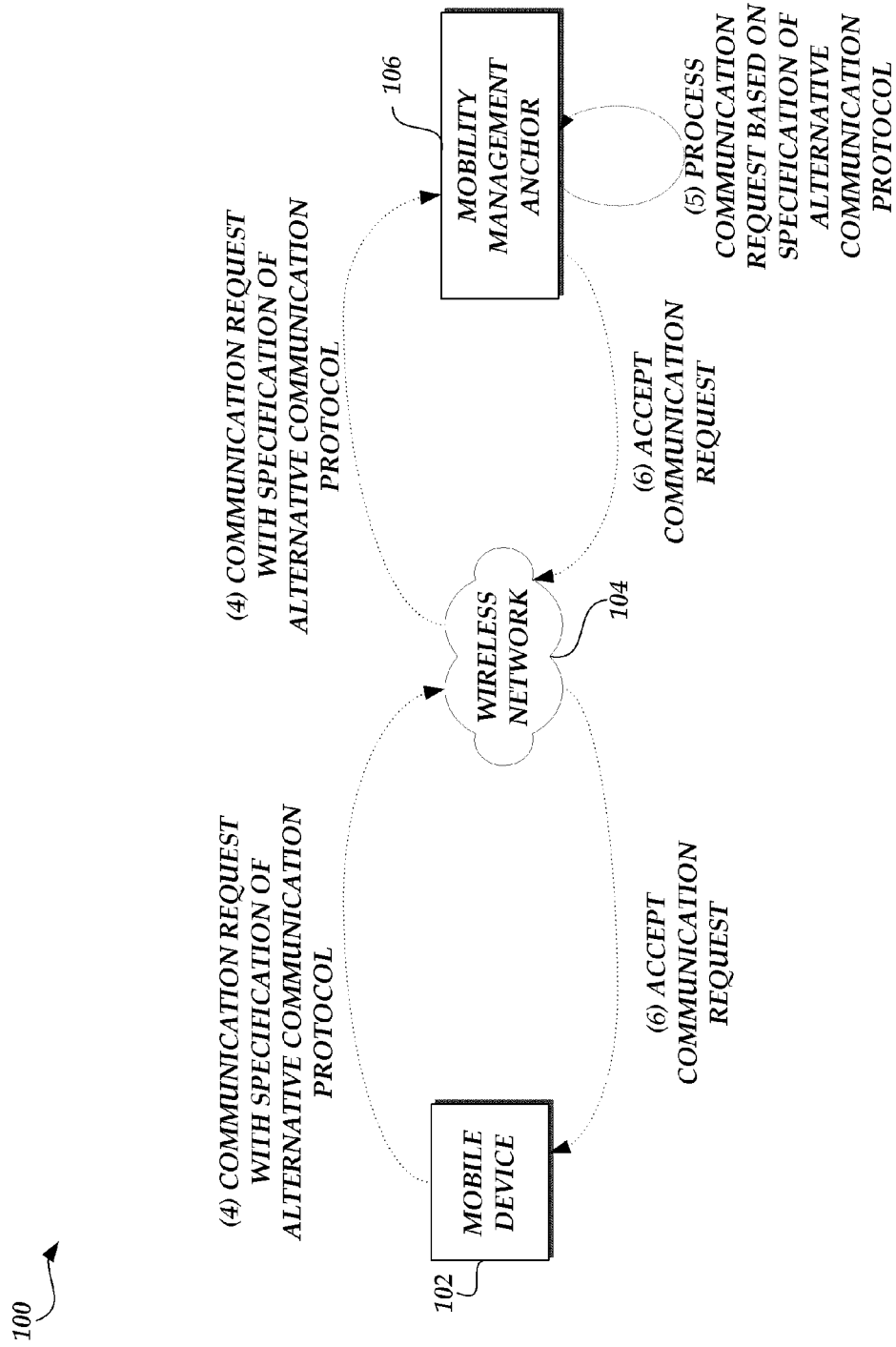

With reference now to FIGS. 3A and 3B, an illustrative example of an embodiment for the specification of communication protocols between a mobile telecommunications-based device 102 and a gateway computing devices, such as the mobility management anchor computing device 106, will be described. With reference to FIG. 3A, in a traditional embodiment, a telecommunications-based device 102 transmits a request to establish communications via the wireless communication network 104. In this traditional embodiment, the request from the telecommunications-based device 102 includes a specification of the addressing protocols to be utilized by the telecommunications-based device 102 in data communications.

For purposes of illustration, assume that the telecommunications-based device 102 request included a specification, by the telecommunications-based device 102, of the IPv6 addressing protocol. If the receiving mobility management anchor computing device 106 does not support IPv6 addressing, or otherwise does not wish the requesting telecommunications-based device 102 to utilize the IPv6 addressing protocol, the mobility management anchor computing device 106 would process and reject the request submitted by the telecommunications-based device 102.

With reference now to FIG. 3B, in the same traditional embodiment, upon receipt of the rejection to the IPv6-based request, the telecommunications-based device 102 would have to transmit a new communication request. In this second request, the telecommunications-based device 102 would specify a different addressing protocol, illustrative IPv4. Assuming the mobility management anchor computing device 106 supports IPv4 addressing for the requesting telecommunications-based device 102, the mobility management anchor computing device 106 would process and accept the request. However, as illustrated in FIGS. 3A and 3B, this traditional approach can be inefficient in requiring at least two or more requests from the telecommunications-based device 102. The embodiment illustrated in FIGS. 3A and 3B may be especially predominant in situations in which the telecommunications-based device 102 is roaming and the mobility management anchor computing device 106 corresponding to a visited network.

Figure 4A:
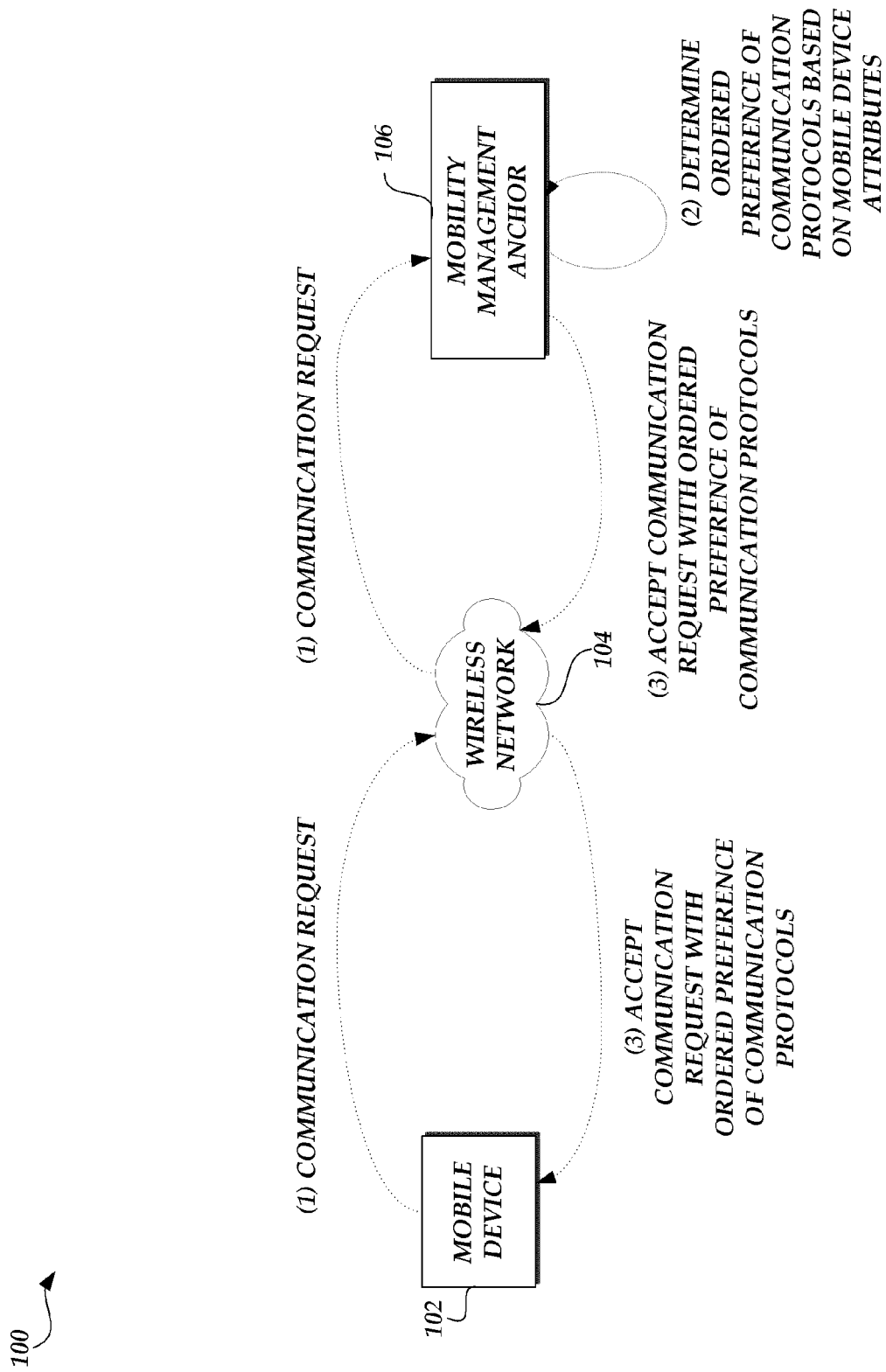
FIGS. 4A and 4B are block diagrams of the telecommunication environment of FIG. 1 illustrating another embodiment for the specification of communication protocols between a mobile telecommunications-based device and a gateway computing device.
Figure 4B:
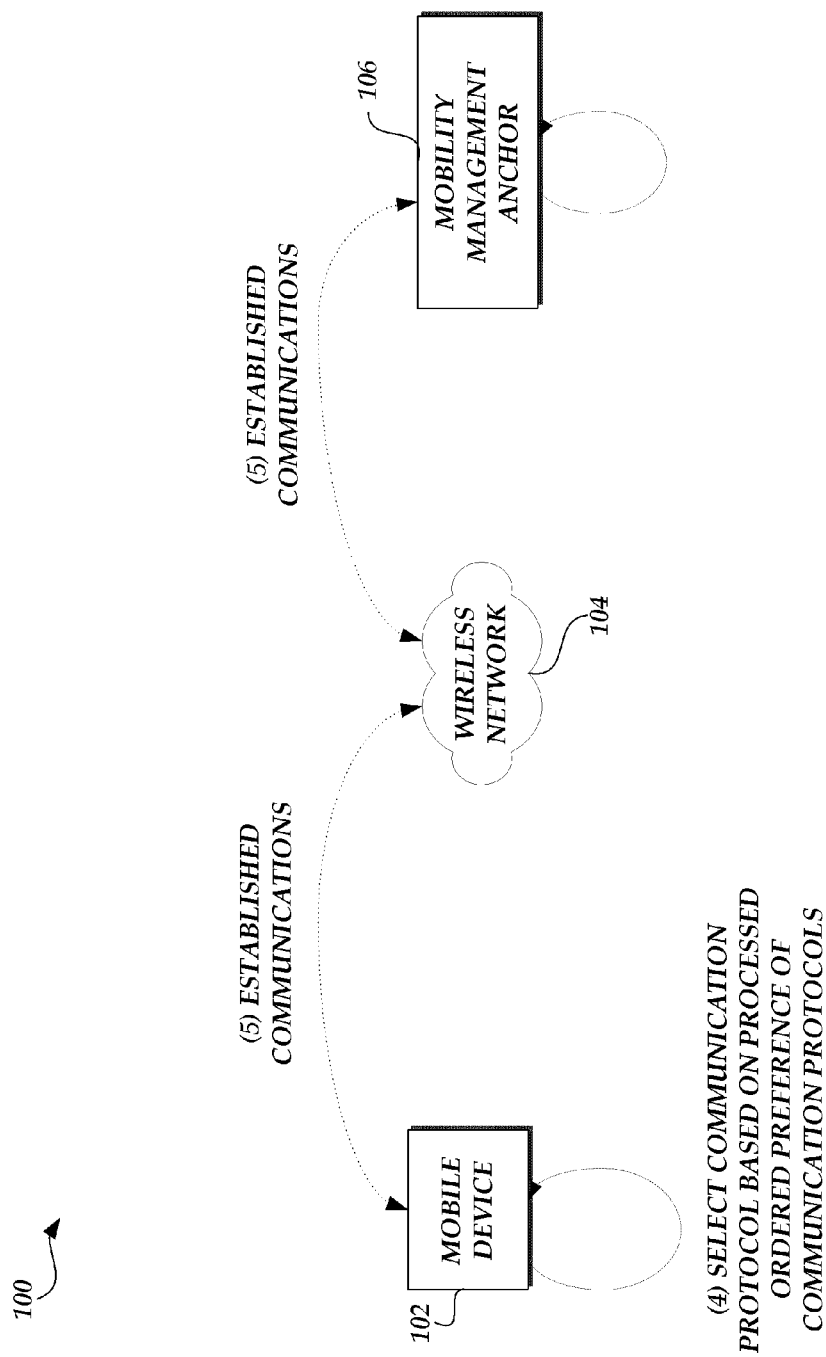

With reference now to FIGS. 4A and 4B, an illustrative example of another embodiment for the specification of communication protocols between a mobile telecommunications-based device 102 and a gateway computing devices, such as the mobility management anchor computing device 106, will be described. With reference to FIG. 4A, in an illustrative embodiment, a telecommunications-based device 102 transmits a request to establish communications via the wireless communication network 104. In this illustrative embodiment, however, the request from the telecommunications-based device 102 does include a specification of the addressing protocols to be utilized by the telecommunications-based device 102 in data communications. In one embodiment, the request does not include any specification of the addressing protocol to be utilized. In another embodiment, the request can include preferences for addressing protocols, or a specification of an addressing protocol can be treated as a preference for an addressing protocol.

In contrast to the embodiment of FIGS. 3A and 3B, the mobility management anchor computing device 106 processes the initial communication request and transmits and acknowledgement/notification to the telecommunications-based device 102. Included in the acknowledgement/notification is an ordered set of addressing protocols the mobility management anchor computing device 106 is specifying for the requesting telecommunications-based device 102. The ordered set of addressing protocols is determined, at least in part, on attributes of the telecommunications-based device 102 and can include the specification of a single specified addressing protocol.

With reference now to FIG. 4B, in this illustrative embodiment, upon receipt of the acknowledgment/notification, the telecommunications-based device 102 processes the ordered set of addressing protocols to select an addressing protocol. The telecommunications-based device 102 then utilizes the selected addressing protocol to establish data communications via the mobility management anchor computing device 106. Additionally, in the event that more than one addressing protocol is specified in the ordered set of addressing protocols, the telecommunications-based device 102 may attempt to establish data connection multiple times in the order of the ordered set of preferences until it can achieve data communications via the mobility management anchor computing device 106.

Figure 5:
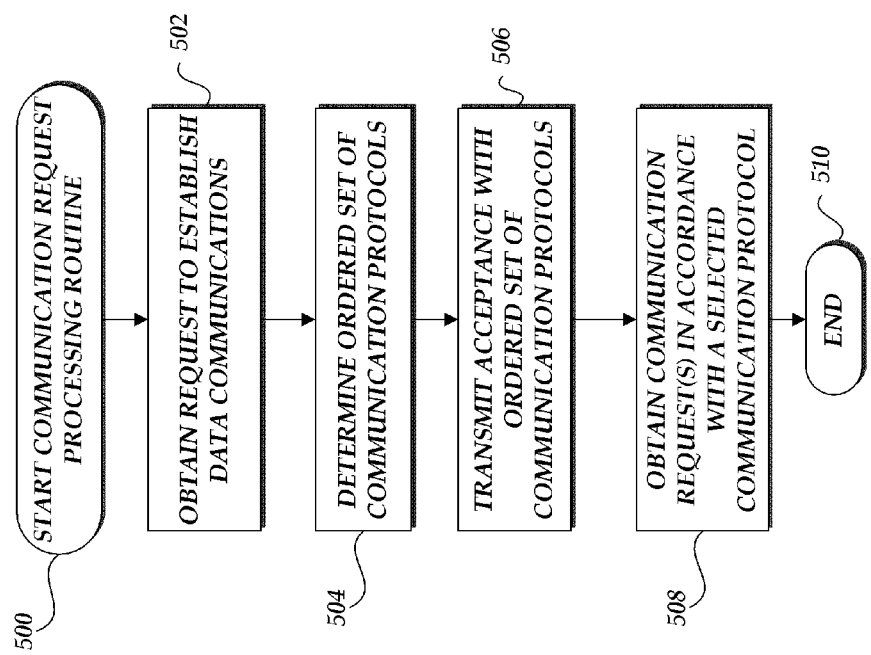
FIG. 5 is a flow diagram illustrative of a communication request processing routine implemented by a gateway computing device in a telecommunication environment.

Turning now to FIG. 5, a flow diagram illustrative of a communication request processing routine 500 implemented by a gateway computing device in telecommunication environment 100, such as the mobility management anchor computing device 106, will be described. At block 502, the mobility management anchor computing device 106 obtains a request to establish data communications from a computing device, such as telecommunications-based device 102 via the wireless communication network 104. For example, the request to establish data communications can correspond to an attach request transmitted from the telecommunications-based device 102. In an illustrative embodiment, the request from the telecommunications-based device 102 can include one or more attributes of the telecommunications-based device 102 (or user of the telecommunications-based device 102) that will be utilized by the mobility management anchor computing device 106 as described below. The attributes of the telecommunications-based device 102 may specifically be included in the request, such as via an application programming interface ("API") or inferred from the communication request.

At block 504, the mobility management anchor computing device 106 processes the request to determine the ordered set of communication protocols to be utilized in data communications with the requesting telecommunications-based device 102. In an illustrative embodiment, the ordered set of set communication protocols includes an ordered set of addressing protocols, which can include the specification of a single addressing protocol. Still further, the ordered set can be specified such that the first specified addressing protocol is considered a primary addressing protocol and any additional specified addressing protocols are considered secondary addressing protocols.

In an illustrative embodiment, the determination of the ordered set of communication protocols can be facilitated through data tables maintained by the mobility management anchor computing device 106 in the communication protocol data stores 108. Specifically, in an illustrative embodiment, the data tables correspond to static tables that define the ordered set of addressing protocols (or other communication protocols) in accordance with one or more attributes associated with the telecommunications-based device 102. Illustratively, the attributes utilized in the selection of the ordered set can include telecommunications-based device 102 device type, roaming status (e.g., in home network vs. in visiting network), roaming plan (e.g., what is the home network and country associated with the telecommunications-based device 102), supported operating system, user descriptors (e.g., type of use or amount of data used), supported applications or applications being executed by the telecommunications-based device 102, and the like. The attributes can correspond to information that can assist in the optimization of the performance of the telecommunications-based device 102 or in the level of service being provided to the user of the telecommunications-based device 102. In an alternative embodiment, the mobility management anchor computing device 106 can dynamically determine the ordered set of communication protocols in accordance with the above-referenced attributes. Additionally, the mobility management anchor computing device 106 can dynamically modify a static specification of the ordered set of communication protocols.

At block 506, the mobility management anchor computing device 106 transmits an acceptance of the communication request, such as an attach accept, or other acknowledgement/notification to the requesting telecommunications-based device 102. The transmitted acceptance includes the specification (either directly or indirectly) of the ordered set of communication protocols. The processing of the ordered set of communication protocols will be described with regard to FIGS. 6 and 7. Thereafter, at block 508, the mobility management anchor computing device 106 obtains an initiation of communications from the requesting telecommunications-based device 102, such as a receive attach acknowledgement, with a selected communication protocol from the ordered set of communication protocols. At block 510, the routine 500 ends.

Turning now to FIG. 6, a flow diagram illustrative of a communication requesting routing 600 implemented by a telecommunications-based device 102 will be described. At block 602, the telecommunications-based device 102 transmits a communication request to the mobility management anchor computing device 106 via the wireless communication network 104. Illustratively, the communication request can correspond to an attach request. As previously discussed, the communication request can include attribute information utilized by the mobility management anchor computing device 106 to process the request and specify an ordered set of communication protocols in reply. The attribute information may be specifically provided as part of the communication request. Alternatively, the attribute information may be included indirectly provided, such as embedded in addressing information.

At block 604, the telecommunications-based device 102 obtains a reply from the mobility management anchor computing device 106. In an illustrative embodiment, the reply from the mobility management anchor computing device 106 corresponds to an acceptance of the communication request or other notification/acknowledgement. As previously discussed, the reply includes the specification of an ordered set of communication protocols the telecommunications-based device 102 may utilize in data communications. At block 606, the telecommunications-based device 102 processes the ordered set of communication protocol to select a communication protocol, such as to select an addressing protocol. An example of the processing of the ordered set of communication protocols will be described with regard to sub-routine 700 (FIG. 7). At block 608, the telecommunications-based device 102 initiates communications with the selected communication protocol. At block 610, the routine 600 terminates.

Referring now to FIG. 7, a flow diagram illustrative of a communication protocol selection sub-routine 700 implemented by the telecommunications-based device 102 will be described. At block 702, the telecommunications-based device 102 obtains the ordered set of communication protocols, such as addressing protocols. As previously discussed, the ordered set of protocols can include a specification of a single communication protocol. Additionally, the ordered set of protocols can designate primary and secondary communication protocols. Accordingly, at decision block 704, a test is conducted to determine whether a single communication protocol has been specified in the ordered set of communication protocols. If so, at block 706, the specified communication protocol is selected and the sub-routine 700 terminates such that the telecommunications-based device 102 will attempt to establish communications in accordance with the selected communication protocol.

With continued reference to FIG. 7, if at decision block 704, multiple communication protocols are specified, at block 708, the telecommunications-based device 102 selects the primary designated communication protocol and then attempts to establish communications in accordance with the selected communication protocol. At decision block 710, a test is conducted to determine whether the telecommunications-based device 102 was able to establish communications in accordance with the selected communication protocol. If so, the sub-routine 700 terminates at block 712. Alternatively, if the telecommunications-based device 102 was not able to establish communications in accordance with the selected communication protocol, at block 714, the telecommunications-based device 102 selects the secondary communication protocol and then attempts to establish communications in accordance with the selected communication protocol. At decision block 716, a test is conducted to determine whether the telecommunications-based device 102 was able to establish communications in accordance with the selected communication protocol. If so, the sub-routine 700 terminates at block 718. Alternatively, the sub-routine 700 terminates in an error at block 720 (or repeats decision block 716 for additional secondary designated communication protocols.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof. As such, reference in the disclosure to actions performed by a module or component relates to the execution of executable instructions by a processing device, or devices, to cause the referenced action to be performed.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing communication in a radio network, comprising:
    obtaining, at a gateway computing device, a request to establish data communications with a mobile device over the radio network, wherein the request is transmitted from the mobile device to the gateway computing device via the radio network, wherein the request identifies an addressing protocol specification for the data communications over the radio network, and wherein the gateway computing device and the mobile device correspond to different physical computing devices interconnected via the radio network;
    in response to the communication request, dynamically determining, at the gateway computing device, addressing protocol preferences for data communications with the mobile device, the addressing protocol preferences specified in at least one of an Internet Protocol version four addressing protocol and an Internet Protocol version six addressing protocol; and
    transmitting, from the gateway computing device to the mobile device, an acceptance of the communication request, independent of the requested addressing protocol specification, to form a data communication channel, the acceptance of the response including the addressing protocol preferences, wherein the mobile device initiates communication via the formed data communication channel in accordance with the addressing protocol preferences.

2. The computer-implemented method as recited in claim 1, wherein the communication request includes identification information corresponding to at least one of the mobile device and a user of the mobile device.

3. The computer-implemented method as recited in claim 1, wherein determining addressing protocol preferences includes:
    maintaining a table defining various addressing protocol preferences mapped to one or more mobile device attributes;
    determining at least one mobile device attribute associated with the communication request; and
    selecting addressing protocol preferences from the table based on the at least one mobile device attribute.

4. The computer-implemented method as recited in claim 3, wherein the one or more mobile device attributes includes mobile device type information, mobile device roaming status, mobile device roaming plan, supported operating system, software application information or use description.

5. The computer-implemented method as recited in claim 1, wherein transmitting the acceptance of the response to the communication request includes transmitting addressing protocol preferences including at least two addressing protocols.

6. The computer-implemented method as recited in claim 1, wherein the addressing protocol preferences include at least one primary addressing protocol and at least one secondary addressing protocol.

7. A computer-implemented method for managing communication in a communication network, comprising:
    transmitting a request to establish communications via the communication network, wherein communications via the communication network can utilize two or more available communication protocols and wherein the request to establish communications does not include a specification of a communication protocol from the two or more available communication protocols;
    obtaining an acceptance of the request to establish data communication, the acceptance of the communication request including an ordered preference of at least one communication protocol selected by a receiving gateway computing device, the at least one communication protocol dynamically specified in the two or more available communication protocols and wherein the acceptance is independent of an addressing protocol specification;
    processing the ordered preference of the at least one communication protocol to select a communication protocol; and
    causing communications via the communication network in accordance with the selected communication protocol.
    causing communications via the communication network in accordance with the selected second communication protocol.

8. The computer-implemented method as recited in claim 7, wherein transmitting the request to establish communications includes transmitting one or more device attributes utilized, at least in part, to select the ordered preference of at least one communication protocol.

9. The computer-implemented method as recited in claim 7, wherein the communication network corresponds to a visited network and wherein transmitting the request to establish communications includes transmitting the request to establish communication to the visited network.

10. The computer-implemented method as recited in claim 7, wherein the ordered preference includes the specification of at least two communication protocols.

11. The computer-implemented method as recited in claim 10, wherein the ordered preference includes a designation of a primary communication protocol and a designation of a secondary communication protocol.

12. The computer-implemented method as recited in claim 7, wherein processing the ordered preference of the at least one communication protocol to select a communication protocol includes if a single communication protocol is specified in the ordered preference, selecting the single specified single communication protocol.

13. The computer-implemented method as recited in claim 12, wherein processing the ordered preference of the at least one communication protocol to select a communication protocol includes if two or more communication protocols are specified in the ordered preference, selecting a first communication protocol specified in the ordered preference; and causing communications via the communication network in accordance with the selected first communication protocol.

14. The computer-implemented method as recited in claim 13, wherein processing the ordered preference of the at least one communication protocol to select a communication protocol includes if two or more communication protocols are specified in the ordered preference, selecting a second communication protocol specified in the ordered preference if communication is not achieved via the first communication protocol specified in the ordered preference; and
   causing communications via the communication network in accordance with the selected second communication protocol.

15. A computer-implemented method for managing communications via a communications network, comprising:
   obtaining, at a gateway computing device, a request to establish communications with a mobile device over the communications network, wherein the request is transmitted from the mobile device to the gateway computing device via the communications network, wherein the request excludes a specification of a communication protocol utilized in communications over the communication network, and wherein the gateway computing device and the mobile device correspond to different physical computing devices interconnected via the communications network;
   determining, by the gateway computing device, an ordered preference of addressing protocols specified in at least two applicable addressing protocols, wherein determining the ordered preference of addressing protocols include determining the ordered preference based, at least in part, on attributes associated with the request; and
   transmitting, by the gateway computing device, a confirmation of the communication request, the confirmation including the ordered preference of addressing protocols.

16. The computer-implemented method as recited in claim 15, wherein the request to establish communications via the communication network includes identification information corresponding to at least one of a mobile device or a user of the mobile device.

17. The computer-implemented method as recited in claim 15, wherein determining the preference of addressing protocols includes:
   maintaining a table defining various addressing protocol preferences mapped to one or more mobile device attributes;
   determining at least one mobile device attribute associated with the communication request, wherein the mobile device attributes are selected from mobile device type information, mobile device roaming status, mobile device roaming plan, supported operating system, software application information, or use description; and
   selecting the ordered preference of communication protocols from the table based on the at least one mobile device attribute.

18. The computer-implemented method as recited in claim 15, wherein determining the preference of communication protocols includes:
   determining at least one mobile device attribute associated with the communication request; and
   dynamically selecting the ordered preference of communication protocols from a table based on the at least one mobile device attribute, wherein the table defines various addressing protocol preferences mapped to one or more mobile device attributes.

19. The computer-implemented method as recited in claim 15, wherein transmitting the confirmation of the communication request includes transmitting an ordered preference of communication protocols including the specification of two or more communication protocols.

20. The computer-implemented method as recited in claim 19, wherein the specification of the two or more protocols includes the specification of at least one primary and at least one secondary communication protocol.

* * * * *

UNITED STATES PATENT AND TRADEMARK OFFICE
CERTIFICATE OF CORRECTION

| | | |
|---|---|---|
| PATENT NO. | : 9,226,131 B2 | |
| APPLICATION NO. | : 14/028317 | |
| DATED | : December 29, 2015 | |
| INVENTOR(S) | : Mehul Jayant Shah | |

It is certified that error appears in the above-identified patent and that said Letters Patent is hereby corrected as shown below:

On the title page
    In column 2 (page 2, item 56) at line 43, Under Other Publications, change "SEssion" to --Session--.

In the claims
    In column 10 at lines 33-35, In Claim 7, after "protocol; and" delete "causing communications via the communication network in accordance with the selected communication protocol.".

Signed and Sealed this
Ninth Day of August, 2016

Michelle K. Lee
*Director of the United States Patent and Trademark Office*